Jan. 17, 1928.

J. FEJES 1,656,189

VEHICLE BRAKE

Filed May 28, 1926

J. Fejes
INVENTOR

By: Marks & Clerk
ATTYS

Patented Jan. 17, 1928.

1,656,189

UNITED STATES PATENT OFFICE.

JENÖ FEJES, OF BUDAPEST, HUNGARY.

VEHICLE BRAKE.

Application filed May 28, 1926. Serial No. 112,343.

This invention relates to an improved construction of brakes and their mounting more particularly on the rear axle of a motor or other vehicle.

The main object of the invention is so to construct and mount the brakes and parts associated therewith that their dynamic forces and in consequence thereof also the vibrations which are usually transmitted by the said dynamic forces to the main springs, chassis frame, etc. are substantially reduced. This main object is attained by making the brake shoes of strips of sheet iron welded together to form hollow structures, as hereinafter more particularly described. By thus constructing the brake shoes their weight and consequently their forces of inertia are greatly reduced as compared with the forces of inertia which are produced when they are much heavier as has been the case with the constructions hitherto employed.

The construction according to the present invention has the further advantage that the heat is rapidly radiated and overheating entirely prevented owing to the walls of the brake shoes being made of thin metal. A still further advantage consists in the great reduction in the cost of manufacture which is due not only to the smaller price of the material as compared with the material hitherto employed but also to the facts that as the vibrations to which the vehicle is subjected are substantially reduced, the various parts of the vehicle, such as the main springs, can be made of smaller dimensions for the same factor of safety, and as the heat is so readily radiated no extra provision has to be made for cooling the brakes in order to prevent overheating.

It is also to be pointed out that owing to the masses of the movable parts being much lighter than the masses of the brakes hitherto employed, the efficiency of the improved brake is correspondingly increased.

Figure 1:
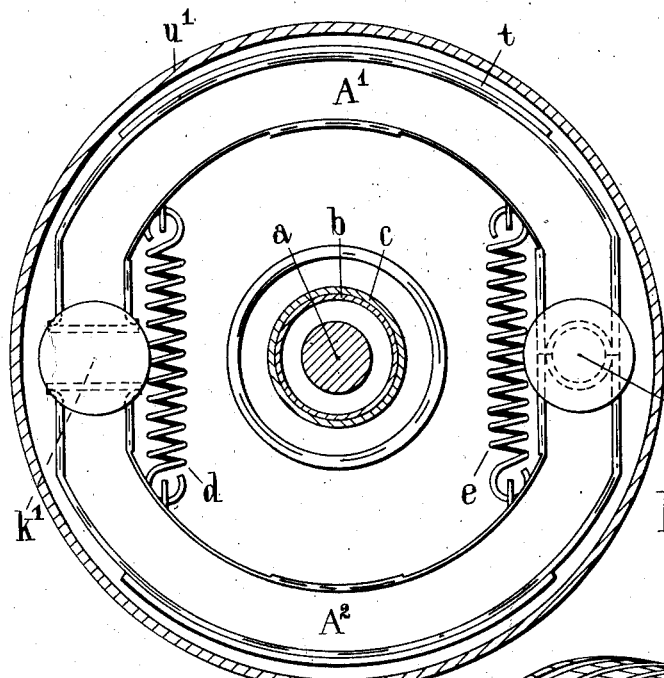

Referring to the accompanying drawings which illustrate the invention by way of example, Figure 1 is a section across the brake drum showing the brake shoes and parts associated therewith in part sectional elevation.

Figure 6:
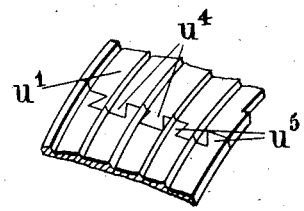
Figure 4:
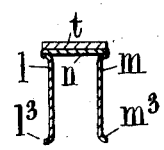
Figure 5:
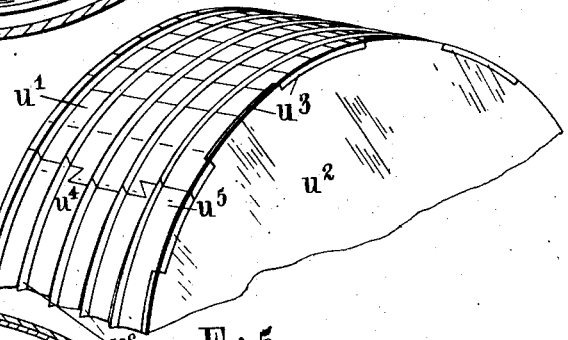
Figure 2:
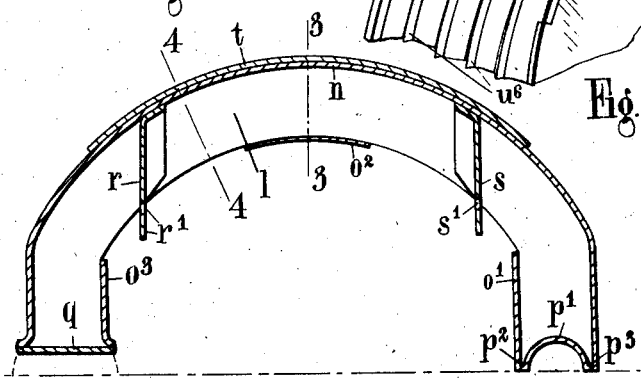
Figure 3:
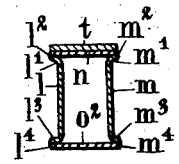

Figure 2 is a sectional elevation of one of the brake shoes,

Figures 3 and 4 are transverse sections along the lines 3—3 and 4—4 in Figure 2 respectively, Figure 5 is a perspective view of a portion of the brake drum, whilst Figure 6 is a detail illustrating a modification of the joint of the cylindrical part of the brake drum.

$a$ is portion of one half of the driving axle $b$ a portion of the tubular outer casing thereof and $c$ is a wrought iron boss slid onto the tubular outer casing $b$. $A_1$ and $A_2$ are a pair of brake shoes which are mounted on two spindles in such a manner as to surround at one side the cylindrical portion $j_2$ of one spindle and abut at the other side against flat surfaces provided on a cam portion $k_1$ formed on the other spindle. The two brake shoes are held in their normal inoperative position by means of springs $d$, $e$ and their operation is effected in the usual way by the rotation of the cam portions $k_1$, when the two spindles are operated by the brake lever and pedal.

Each brake shoe consists of two flanged side strips $l$, $m$ of sheet metal and an outer peripheral strip $n$ also of sheet metal which is edge welded onto the flanges $l_1$, $m_1$ of the side strips as shown at $l_2$ and $m_2$ respectively. The shoe is reinforced by inner strips of sheet metal $o_1$, $o_2$, $o_3$ which are edge welded onto the flanges $l_3$, $m_3$ of the side strips as shown for instance at $l_4$, $m_4$ in connection with the strip $o_2$. The one end of the brake shoe is formed with a half cylindrical portion $p_1$ of sheet metal provided with extensions $p_2$ and welded onto the four strips $l$, $m$, $n$ and $o_1$, whilst the other end thereof is provided with a sheet metal strip $q$ which is edge welded onto the four strips. $r$ and $s$ are further strengthening means of sheet metal provided in the interior of the shoe and welded onto the side strips $l$, $m$ and outer strip $n$, the said strips $r$ and $s$ serving to receive the ends of the springs $d$, $e$, for which purpose they are provided with eyes $r_1$ $s_1$. $t$ is the usual strip of Ferodo which is suitably secured to the strip $n$.

The brake drum is also made of sheet metal and it comprises in addition to the cylindrical brake portion $u_1$ a disc-like portion $u_2$ by which it is secured in the usual manner, to the wheel of the vehicle. The two portions $u_1$ and $u_2$ of the brake drum are dove-tailed into one another as shown at $u_3$, being edge welded all along the adjoining edges of the dove-tail connections. The cylindrical portion $u_1$ of the drum is made of a piece of sheet iron having the required width and length, its two ends being dove-tailed as shown at $u_4$ and $u_5$ and butt-welded all along the edge of the dove-tail connection. In this way the resistance of the drum to the stresses to which it is subjected is substantially increased. Further, the portion $u_1$ of the drum is formed with ribs $u_6$ which may be obtained by milling. Instead of one dove-tail, a plurality of such connections may be provided along the connecting ends of the strip of sheet metal used for the cylindrical portion $u^1$, for instance such as shown in Figure 6.

I wish it to be understood that the invention is not limited to the details hereinbefore given by way of example as the same may be modified in various respects without in any way departing from the spirit of the invention.

What I claim is:

1. A hollow brake shoe for wheels of motor and other vehicles made of strips of sheet iron welded at their edges, certain of the strips having flanges to allow edge welding being effected, as set forth.

2. A hollow brake shoe for wheels of motor and other vehicles made of two side strips of sheet iron ($l$, $m$), an outer peripheral strip of sheet iron ($n$) inner strengthening strips of sheet iron ($o_1$, $o_2$, $o_3$) and end strips of sheet iron ($p_1$ $q$), which strips are welded together and for which purpose some of the said strips have flanges, as set forth.

3. A hollow brake shoe for wheels of motor and other vehicles as claimed in claim 2 having internal strengthening strips of sheet iron ($r$, $s$) welded onto the side strips ($l$, $m$) and to the outer peripheral strip ($n$) and having means for engagement with the usual springs of the brake shoes, as set forth.

In testimony whereof I have signed my name to this specification.

JENÖ FEJES.